Nov. 18, 1958     T. A. WELLS     2,860,868
WEIGHING SYSTEM
Filed July 25, 1955     2 Sheets-Sheet 1
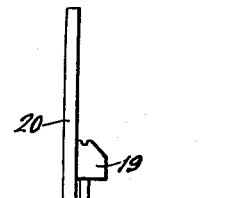
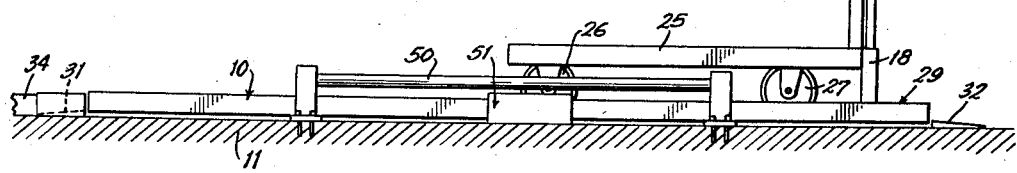
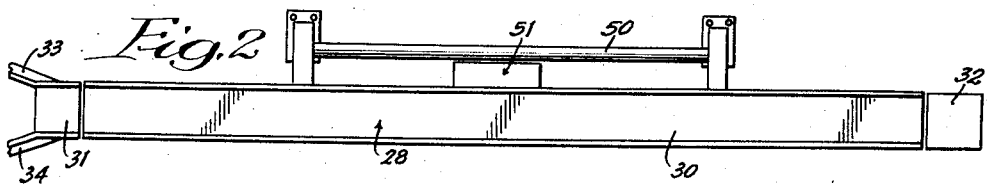
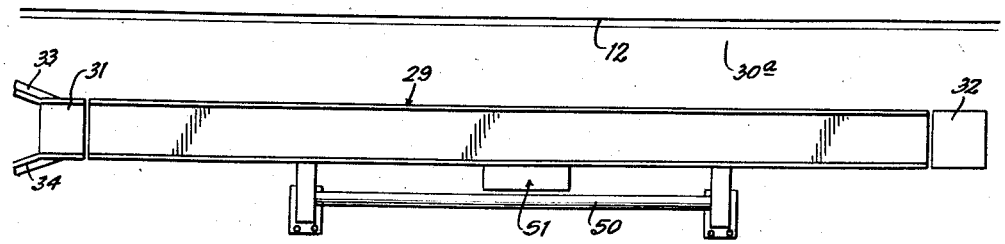
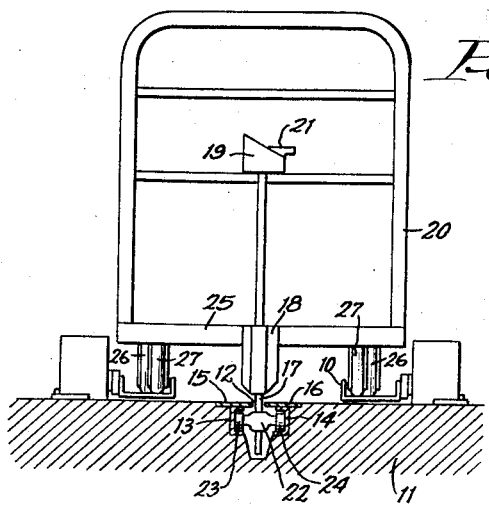
INVENTOR:
Theodore A. Wells,
BY
Dawson, Tilton & Graham
ATTORNEYS.

Nov. 18, 1958
T. A. WELLS
2,860,868
WEIGHING SYSTEM
Filed July 25, 1955
2 Sheets-Sheet 2
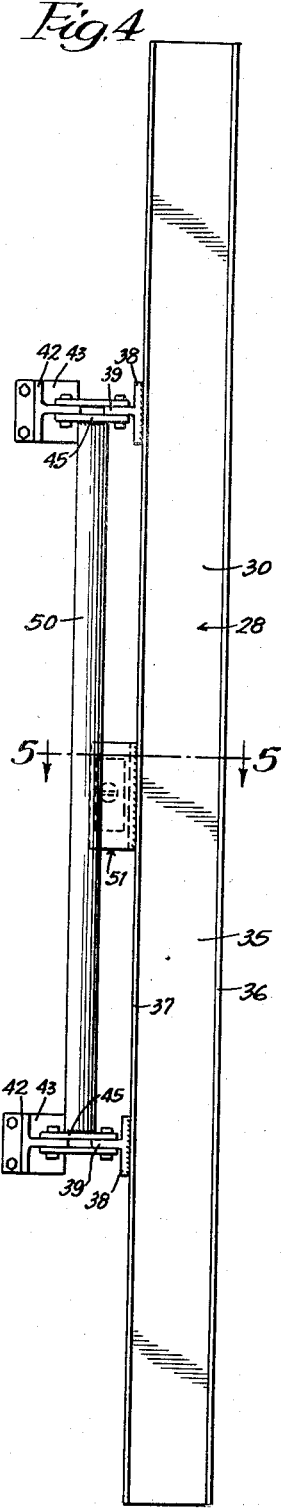
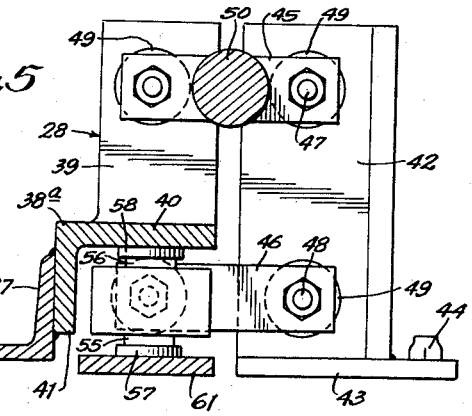
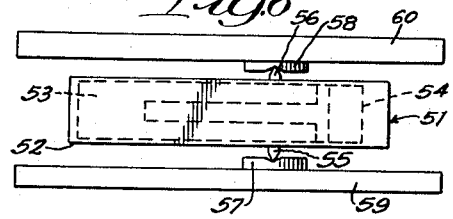
INVENTOR:
Theodore A. Wells,
BY
Dawson, Tilton & Graham,
ATTORNEYS.

United States Patent Office 2,860,868
Patented Nov. 18, 1958

2,860,868

WEIGHING SYSTEM

Theodore A. Wells, Wichita, Kans., assignor to Central Engineering Corporation, Wichita, Kans., a corporation of Kansas Application July 25, 1955, Serial No. 524,212

7 Claims. (Cl. 265—71)

This invention relates to a weighing system, and more particularly to a system for weighing dragline carts and the like.

In freight terminals, warehouses, etc., commodities are frequently transferred from one location to another by dragline carts, and such carts are similarly employed in loading and unloading commodities to and from the warehouse. Dragline carts ordinarily comprise a platform supported on front and rear wheels and are connected to cables that pull the carts about the warehouse. The cables are ordinarily located beneath the floor surface and are connected to the carts at depending portions thereof that ride in channels provided in the floor for that purpose. In some systems, however, the carts are moved from place to place by overhead cables connected to the carts by an overhead chain and rigid mast carried by the cart.

In trucking terminals, it is necessary for purposes of properly inventoring merchandise, and to check the accuracy of shipping manifests accompanying articles of freight, to weigh each load of such articles carried by a dragline cart. The weighing facilities now available for this constitute conventional scales onto which the individual loads must be placed either before or after they are loaded onto the dragline carts. Such an arrangement constitutes an inconvenience and necessitates repetitious handling of merchandise and, of course, is then costly. A need has long existed for an improved system for weighing loads carried by dragline carts.

It is, accordingly, an object of this invention to provide a system for readily and conveniently weighing the loads carried by dragline carts and like vehicles. Another object of the invention is to provide a weighing system especially adapted for use in freight terminals and warehouses, etc. for weighing dragline carts and the like, and in which the system can be installed in a matter of minutes, wherein all of the mechanism in the weighing system is above the floor and which can be quickly and easily moved if desired from one location to another.

A further object of the invention is in the provision of a dragline weighing system wherein a dragline cart is moved onto a weighing scale, the scale being an electrical weighing device, and arranged so that variations in the lateral position of the wheels of a cart have no effect on the accuracy of the weight indications. Still a further object of the invention is in the provision of a weighing arrangement of the character described in which a pair of runways are provided, each adapted to receive the wheels of a dragline cart at one side thereof, the runways being connected to rigid supports by a link structure affording limited movement of the runways in a predetermined plane, and in which certain of the links are interconnected by torque transfer bars, whereby the bars and links coact to afford an accurate indication of the magnitude of a load translated to a load sensitive weighing scale through the runways. Additional objects and advantages will become apparent as the specification develops.

An embodiment of the invention is illustrated in the accompanying drawings, in which—

Figure 1 is a side view in elevation of a weighing system embodying the invention, and in which a dragline cart is shown positioned on the scale thereof; Figure 2 is a top plan view of the scale illustrated in Figure 1, but with the cart removed; Figure 3 is an end view in elevation of the structure shown in Figure 1, and in which a portion of the dragline unit is illustrated in section; Figure 4 is an enlarged top plan view of one of the weigh scale runway assemblies illustrated in Figure 2; Figure 5 is a transverse sectional view taken along the line 5—5 of Figure 4; and Figure 6 is a side view in elevation of the load sensitive weighing cell.

The dragline scale indicated generally by the numeral 10 in Figure 1 is adapted to be secured along the upper surface of a floor 11 having, as is seen in Figures 2 and 3, a channel or slot 12 therein adapted to receive the chains and connectors, etc. of a dragline system. It is seen in Figure 3 that mounted within the slot or channel 12 are a pair of generally U-shaped channel members 13 and 14 disposed on their sides and oriented in spaced apart facing relation. The upper legs of the channels 13 and 14 are covered by metal plates 15 and 16 that are spaced apart and have extending therebetween a relatively rigid mast 17 that is slidable vertically within supports 18 and 19 carried by a dragline cart 20. The mast 17 at its upper end may be equipped with a handle 21 that serves to elevate and rotate the mast to position it either in the downward position shown in Figure 3 or in an upward position wherein it is withdrawn from the channel 12. A cable connector 22 equipped with wheels 23 and 24 which ride in the channels 13 and 14 is adapted to slidably receive the lower end portion of the mast 17, and is connected with a chain so that when the mast is in the position illustrated in Figure 3, the cart 20 can be moved about the warehouse or other structure having the dragline system.

The cart 20 is provided with a platform 25 adapted to support merchandise thereon. The platform 25 is equipped with front and rear wheels 26 and 27 on each side thereof that are adapted to ride on the floor 11.

The dragline scale 10 is provided with a pair of substantially identical runway assemblies 28 and 29 that are positioned in spaced apart relation at equal distances on each side of the channel 12 and in alignment respectively with the wheels 26 and 27 on each side of the cart 20. As is shown most clearly in Figure 3, the wheels of the cart are adapted to be received on and ride along the runways of the assemblies 28 and 29.

The runway assemblies each have a runway member of U-shaped, channel-like configuration designated respectively by the numerals 30 and 30a in Figures 2 and 3 for purposes of identification. As will be brought out in greater detail hereinafter, each of the runway members is adapted to be supported for free vertical movement and is positioned slightly above the upper surface of the floor 11. Therefore, it is preferred to employ ramps 31 at the entrance ends of the runways and ramps 32 at the exit ends thereof. The ramps may be formed in any suitable manner and serve to facilitate the movement of the wheels 26 and 27 onto and off of the runways. For example, the ramps may be formed of Stonehard or other suitable concrete facing material. Preferable, the ramps 31 are each equipped with guides 33 and 34 that define generally V-shaped mouths leading to the ramps and function to guide the wheels of the cart 20 onto the runways 30 and 30a.

As has been brought out, the assemblies 28 and 29 are substantially identical and, therefore, except for the description thereof set forth heretofore, only one of these assemblies will be described in detail, for the detailed description will apply equally to the other. In this description which is to follow, reference will be made in particular to Figures 4 and 5, and it will be assumed that the runway assembly illustrated in detail in these figures is assembly 28 having the runway 30.

The runway 30 is preferably in the form of a U-shaped channel having a base or support 35 and spaced apart walls 36 and 37 formed integrally therewith and extending upwardly therefrom. The base 35 is spaced above the upper surface of the floor 11, as is shown in Figure 5, by a distance that may be approximately one-half of an inch. The base 35 is also horizontally disposed and the legs 36 and 37 then are oriented in vertical planes. It will be appreciated that the runway members may have forms other than the specific configuration shown in the drawings.

The member 30, and specifically the wall 37 thereof, is rigidly secured by welding or other suitable means to the base portion 38 of a standard 39. Also rigidly secured to the wall 37 intermediate the ends thereof and substantially at the center thereof is a perch 38a having a generally horizontal platform portion 40 and a depending wall 41 that extends along the wall 37 of the runway member. The perch is substantially L-shaped, as is shown clearly in Figure 5. Each runway member has associated therewith a pair of standards 39, as is seen clearly in Figure 4, and each of the standards is operatively connected to a support member 42 equipped with a platform 43 adapted to be rigidly secured to the floor 11 by anchor bolts 44. The support members 42 are aligned with the standards 39 and are connected thereto by a pair of upper links 45, one disposed on each side of the standard, and a pair of lower links 46, one being disposed on each side of the support member and standard.

The paired links 45 and 46 are secured together by bolts 47 and 48 respectively—there being two of each, one extending through the links and the standard 39, and the other extending through the links and the support member 42. The links 45 and 46 are parallel and are pivotally connected to the standard and support member by anti-friction bearings, such as sealed aircraft ball bearings, which do not require periodic relubrication. The bearings at each point of connection may be identical and, therefore, are each designated with the numeral 49. This assembly provides relatively free vertical movement of the standard 39 and the runway 30 carried thereby with respect to the support member 42 which is firmly and rigidly anchored to the floor 11.

Extending between the facing upper links 45 of the two spaced apart support members and standard assemblies associated with each of the runway members, as is shown most clearly in Figure 4, is a torque bar 50 that is rigidly secured at each end to the innermost or facing links 45. The torque bar 50 functions to couple and unify the loads imposed on the runway members 30 at spaced points by the spaced front and rear wheels 26 and 27 of a dragline cart. This arrangement permits considerable variation in the longitudinal positioning of the wheels of the dragline cart along the runway members without disturbing the accuracy of the weight indications provided by the scale assembly. The parallel linkage described functions to permit only true vertical movement of the runway members through a limited distance, and as a result variations in the lateral position of the wheels 26 and 27 on the runway members will have no effect on the accuracy of the weight indication provided by the weigh system. The bars 50 may extend between the lower links.

The actual weighing or load sensing is accomplished by a weight sensitive load cell 51 that, as is seen most clearly in Figure 6, comprises an outer casing 52 having mounted therein a generally U-shaped deflection member 53 equipped at one end thereof with an inductance unit 54. Knife-edge bearing members 55 and 56 are provided by the casing 52 and bear within V-shaped notches or grooves provided in the bearing plates 57 and 58 that are carried by platform members 59 and 60, that in turn are secured respectively to a bed plate 61 supported on the upper surface of the floor 11 and the horizontally disposed portion 40 of the perch 38a. When a load is imposed across the legs of the U-shaped deflection member 53 by application of a load to the knife-edge bearing members 55 and 56, the legs deflect in proportion to the load and vary the inductance of the inductance assembly 54 which will be connected through circuits (not shown) to an indicator that will record or indicate the load in terms of weight. A load cell that has been used successfully is disclosed in Patent No. 2,709,790.

In use of the dragline scale, the runway assemblies 28 and 29 are secured to the floor 11 by means of the anchor bolts 44 which extend through the base plates of the standards 39. These anchor bolts provide the only securing means necessary to anchor the assemblies in position, and it will be appreciated then that the scale can be moved readily from place to place. Further, the scale can be installed in a matter of minutes simply by driving the bolts into the floor 11 at the proper locations. Moreover, all of the weighing mechanism is located above the upper surface of the floor 11 and that further simplifies installation. Movable or stationary ramps may be provided as desired to fit the type of installation.

In using the system advantageously, all of the carts 20 in a warehouse or terminal should have the same unloaded weight (or allowance made for the individual tare weights in the weighing computation), and to accomplish this result all of the carts may be ballasted to weigh the same as the heaviest cart. Therefore, the indicator for the scale will show accurately and absolutely the weight of the load being carried by any given cart.

When it is desired to ascertain the load carried by a cart 20, that cart is moved onto the runways 30 and 30a, and these runway members will tend to move downwardly toward the upper surface of the floor 11. Downward movement of the runway members will cause a force or load to be applied between the platform member 40 and the bed plate 61 (reference should now be made to Figure 5) and, therefore, across the load cell 51 which will respond to and, with the circuits and indicator connected therewith, will provide an accurate indication of the magnitude of that load. The amount of deflection permitted by the load cell 51 is very slight and is a very small fraction of an inch so that the clearance of about one-half an inch between the floor 11 and runway members is more than sufficient.

The anti-friction bearings that provide a pivotal coupling between the support members 42 and the runway members 30, or more specifically the standards 39 thereof, afford substantially frictionless movement of the standards with respect to the support members. The parallel linkage permits the standards to move vertically along lines parallel to the support members 42 through limited distances, such distances being greater than the amount of deflection or movement permitted by the load cell 51. Therefore, variations in lateral positioning of the wheels of a cart 20 on the runway members 30 will not influence the accuracy of the weight indications provided by the cells 51. Each torque bar 50 rigidly connects selected links of the spaced supports for the respective runway members, with the result that variations in longitudinal positioning of the cart 20 along the runway members is ineffective to influence the accuracy of the weight indications provided by the cells 51.

The system is readily installed and conveniently used and provides accurate weight indications. Further, the response of the weight cells 51 is almost instantaneous, and accurate load indications are provided while the dragline carts 20 are moving along the runway members 30. That is to say, it is not necessary to stop the dragline carts in order to obtain accurate weighings of the loads carried thereby.

While in the foregoing specification an embodiment of the invention has been set forth in considerable detail for purposes of making a complete disclosure, it will be apparent to those skilled in the art that numerous changes may be made in those details without departing from the spirit and principles of the invention.

I claim:

1. In combination with a relatively rigid floor, a weigh scale adapted for use in ascertaining the loads carried by dragline carts and the like, comprising a pair of spaced apart runway members adapted to receive the wheels of a dragline cart thereon, each of said runway members being equipped with a pair of spaced apart standards extending upwardly therefrom, a pair of support members for each said runway member and being oriented in alignment with the standards thereof, means anchoring said support members to said floor, a bed plate for each said runway and being supported on said floor beneath a portion of the runway, load sensitive means interposed between each said portion and each bed plate for receiving a load imposed on the runway associated therewith, link members pivotally connecting each support member and standard to afford substantially free movement of the standards with respect to the support members within predetermined limits while preventing substantially all movement in other directions, and a torque bar extending between the links at each support member and being rigidly secured thereto.

2. The structure of claim 1 in which a pair of vertically spaced, parallel links pivotally connect each support member and the respective standards.

3. In a weigh scale structure adapted for use in the weighing of dragline carts and the like, a pair of spaced apart, vertically extending support members, a runway extending along said support members and being adapted to receive the wheels of a dragline cart thereon, said runway member being equipped with a pair of spaced apart standards, vertically oriented and being aligned with said support members, a pair of vertically spaced, parallel links coupling each said support member and standard, load sensitive means mounted for receiving the vertical components of loads supported on said runway, said links being pivotally secured to said support members and standards to function so as to afford substantially free vertical movement of the standards with respect to the support members while constraining the standards against movement in other directions, and a relatively rigid torque bar extending between the corresponding link at each support member and being rigidly secured thereto.

4. In a weigh scale structure adapted for use in the weighing of dragline carts and the like, a pair of spaced apart, vertically extending support members, a runway extending along said support members and being adapted to receive the wheels of a dragline cart thereon, said runway member being equipped with a pair of spaced apart standards, vertically oriented and being aligned with said support members, a pair of vertically spaced, parallel links pivotally connecting each said support member and standard for relative articulation thereof about a generally horizontal axis, load sensitive means mounted for receiving the vertical components of loads supported on said runway, and a relatively rigid torque bar extending between the corresponding link at each support member and being rigidly secured thereto.

5. In a weigh scale structure of the character described adapted for use in the weighing of a dragline cart and the like, a pair of spaced apart support members, a runway extending along said support members for receiving the wheels of a dragline cart thereon, link means for each of said support members coupling the same to said runway to afford substantially free vertical movement of the runway with respect to the support members within a predetermined limited distance while constraining relative movement between the support members and runway in other directions, a load sensitive means mounted with respect to said runway for having imposed thereacross the vertical components of loads supported on said runway, and a relatively rigid torque bar extending between the respective link means and being rigidly secured thereto.

6. The structure of claim 5 in which said load sensitive means is positioned intermediate said spaced apart support members.

7. In a weigh scale structure adapted for use in ascertaining the loads carried by dragline carts and the like, a pair of spaced apart runway members adapted to receive the wheels of a dragline cart thereon, each of said runway members being equipped with a pair of spaced apart standards, a pair of support members for each of said runway members and being oriented in alignment with the respective standards thereof, load sensitive means arranged with each of said runway members for having imposed thereon the load carried by the runways, link members pivotally connecting each of said support members and the respective standards to afford substantially free movement of the standards in a direction generally normal to said load sensitive means with respect to the support members within predetermined limits while constraining substantially all movement of said standards in other directions with respect to said support members, and a torque bar extending between each pair of support members and being rigidly secured to the links thereof.

References Cited in the file of this patent

UNITED STATES PATENTS

| | | |
|---|---|---|
| 993,216 | Allen | May 23, 1911 |
| 1,667,717 | Brinton | May 1, 1928 |
| 1,759,885 | Bousfield | May 27, 1930 |
| 2,162,622 | Lindsay | June 13, 1939 |
| 2,167,075 | Hobson et al. | July 25, 1939 |
| 2,358,770 | Carliss | Sept. 19, 1944 |
| 2,564,361 | Hanssen | Aug. 14, 1951 |
| 2,670,195 | Baker | Feb. 23, 1954 |
| 2,673,082 | Thurston | Mar. 23, 1954 |
| 2,736,549 | Paul | Feb. 28, 1956 |
| 2,755,097 | Elconin | July 17, 1956 |